US012602313B2

(12) United States Patent (10) Patent No.: US 12,602,313 B2
Fan et al. (45) Date of Patent: Apr. 14, 2026

(54) SMART MECHANISM TO EVALUATE PERFORMANCE OF TEST ENGINEERS

(71) Applicant: Dell Products L.P., Round Rock, TX (US)

(72) Inventors: Huijuan Fan, Chengdu (CN); Steven Wenguo Shen, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 187 days.

(21) Appl. No.: 18/367,515

(22) Filed: Sep. 13, 2023

(65) Prior Publication Data

US 2025/0036561 A1 Jan. 30, 2025

(30) Foreign Application Priority Data

Jul. 28, 2023 (CN) .......................... 202310946969.7

(51) Int. Cl.
*G06F 9/44* (2018.01)
*G06F 11/3668* (2025.01)
*G06F 11/3698* (2025.01)

(52) U.S. Cl.
CPC ...... *G06F 11/3698* (2025.01); *G06F 11/3688* (2013.01)

(58) Field of Classification Search
CPC ............. G06F 11/3688; G06F 11/3684; G06F 11/3698; G06F 11/3692; G06F 11/3672; G06F 11/3612; G06F 11/3668; G06F 11/362; G06F 11/3604; G06F 11/36;

G06F 8/70; G06F 11/3409; G06F 11/3608; G06F 2221/033; G06F 11/079; G06F 9/455; G06F 8/77; G06F 8/35; G06F 11/2294; G06F 11/3051; G06F 11/2273; G06F 11/3452; G06F 2009/45562; G06F 11/3428; G06F 11/3447; G06F 8/73; G06F 11/34; G06F 2221/034; G06F 11/27

See application file for complete search history.

(56) References Cited

U.S. PATENT DOCUMENTS

| | | | |
|---|---|---|---|
| 2017/0091071 A1* | 3/2017 | Chitale | G06Q 10/06375 |
| 2018/0095859 A1* | 4/2018 | Jayaraman | G06F 11/3688 |
| 2019/0196950 A1* | 6/2019 | Ranganathan | G06F 11/3676 |

* cited by examiner

*Primary Examiner* — Chuck O Kendall
(74) *Attorney, Agent, or Firm* — Krishnendu Gupta; Lesley Leonessa

(57) ABSTRACT

Methods, system, and non-transitory processor-readable storage medium for a resource evaluation system are provided herein. An example method includes obtaining defect data obtained in response to executing software on a plurality of tester systems. The resource evaluation system determines a performance weighted metric associated with a defect detection resource and the defect data. Using the performance weighted metric, the resource evaluation system determines a defect scope delta percentage associated with the defect detection resource and the defect data. The resource evaluation system then determines a defect detection resource score based on the defect scope delta percentage.

20 Claims, 4 Drawing Sheets

200 — OBTAIN, BY A RESOURCE EVALUATION SYSTEM, DEFECT DATA OBTAINED IN RESPONSE TO EXECUTING SOFTWARE ON A PLURALITY OF TESTER SYSTEMS

202 — DETERMINE, BY THE RESOURCE EVALUATION SYSTEM, A PERFORMANCE WEIGHTED METRIC ASSOCIATED WITH A DEFECT DETECTION RESOURCE AND THE DEFECT DATA

204 — USING THE PERFORMANCE WEIGHTED METRIC, DETERMINE A DEFECT SCOPE DELTA PERCENTAGE ASSOCIATED WITH THE DEFECT DETECTION RESOURCE AND THE DEFECT DATA

206 — DETERMINE A DEFECT DETECTION RESOURCE SCORE BASED ON THE DEFECT SCOPE DELTA PERCENTAGE

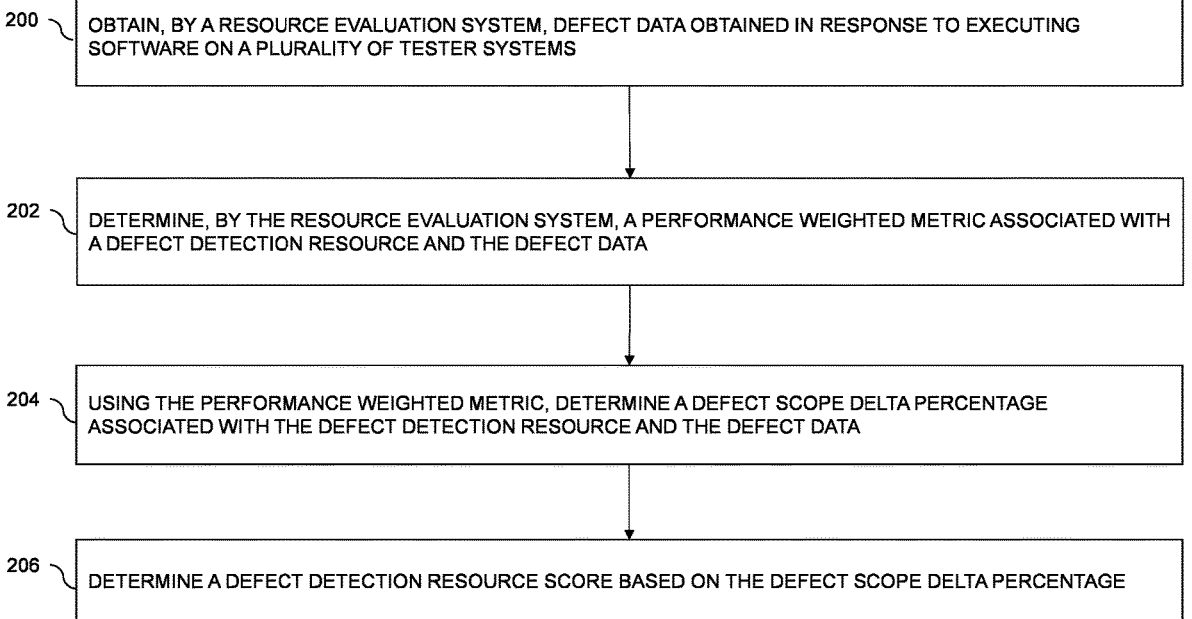

200    OBTAIN, BY A RESOURCE EVALUATION SYSTEM, DEFECT DATA OBTAINED IN RESPONSE TO EXECUTING SOFTWARE ON A PLURALITY OF TESTER SYSTEMS

202    DETERMINE, BY THE RESOURCE EVALUATION SYSTEM, A PERFORMANCE WEIGHTED METRIC ASSOCIATED WITH A DEFECT DETECTION RESOURCE AND THE DEFECT DATA

204    USING THE PERFORMANCE WEIGHTED METRIC, DETERMINE A DEFECT SCOPE DELTA PERCENTAGE ASSOCIATED WITH THE DEFECT DETECTION RESOURCE AND THE DEFECT DATA

206    DETERMINE A DEFECT DETECTION RESOURCE SCORE BASED ON THE DEFECT SCOPE DELTA PERCENTAGE

FIG. 2

SMART MECHANISM TO EVALUATE PERFORMANCE OF TEST ENGINEERS

FIELD

The field relates generally to evaluating defect detection performance, and more particularly to evaluating defect detection performance in information processing systems.

BACKGROUND

Customers demand high quality software, and comprehensive test coverage is one component of software quality. Comprehensive test coverage of software provided by test engineers, therefore, is critical to the success of a software project. Therefore, an accurate evaluation of the test engineers performing the testing is crucial.

SUMMARY

Illustrative embodiments provide techniques for implementing a resource evaluation system in a storage system. For example, in illustrative embodiments, the resource evaluation system obtains defect data, in response to executing software on a plurality of tester systems. The resource evaluation system determines a performance weighted metric associated with a defect detection resource and the defect data. Using the performance weighted metric, the resource evaluation system determines a defect scope delta percentage associated with the defect detection resource and the defect data. The resource evaluation system determines a defect detection resource score based on the defect scope delta percentage.

Other types of processing devices can be used in other embodiments. These and other illustrative embodiments include, without limitation, apparatus, systems, methods and processor-readable storage media.

BRIEF DESCRIPTION OF THE DRAWINGS

FIG. 2 shows a flow diagram of a process for a resource evaluation system in an illustrative embodiment.

DETAILED DESCRIPTION

Figure 1:
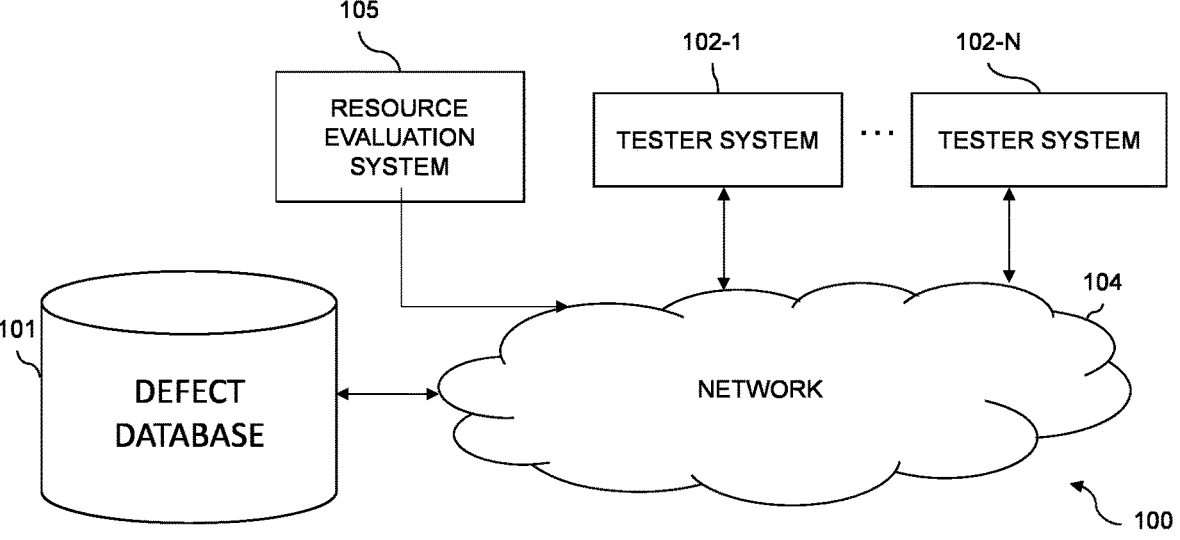
FIG. 1 shows an information processing system including a resource evaluation system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a resource evaluation system, which technique may be used to provide, among other things, evaluation of defect detection resources. The resource evaluation system obtains defect data, in response to executing software on a plurality of tester systems. The resource evaluation system determines a performance weighted metric associated with a defect detection resource and the defect data. Using the performance weighted metric, the resource evaluation system determines a defect scope delta percentage associated with the defect detection resource and the defect data. The resource evaluation system determines a defect detection resource score based on the defect scope delta percentage.

Every team requires an efficient way to evaluate the performance of team members, not only time spent on different types of tasks, but also the professional ability to handle assigned tasks. For example, performance evaluation may comprise the productivity of team members and the breadth and depth of the team members knowledge. A team member's skill breadth and depth of knowledge is a company's technology power, and core competitiveness of the team member, team, and company.

Conventional technologies for evaluating resources do not comprehensively evaluate team member's performance. Conventional technologies for evaluating resources do not evaluate the breadth and depth of the team members knowledge. Conventional technologies for evaluating resources do not evaluate resources' performance based on multiple skill levels. Conventional technologies for evaluating resources do not evaluate resources' performance using both skill level and productivity. Conventional technologies for evaluating resources do not provide accurate resource evaluations. Conventional technologies for evaluating resources do not provide the ability to use historical data of various skill levels. Conventional technologies for evaluating resources do not increase the applicability and feasibility of evaluating resources' performance through the use of historical data of various skill levels.

By contrast, in at least some implementations in accordance with the current technique as described herein, resource evaluation is optimized by obtaining defect data, in response to executing software on a plurality of tester systems. The resource evaluation system determines a performance weighted metric associated with a defect detection resource and the defect data. Using the performance weighted metric, the resource evaluation system determines a defect scope delta percentage associated with the defect detection resource and the defect data. The resource evaluation system determines a defect detection resource score based on the defect scope delta percentage.

Thus, a goal of the current technique is to provide a method and a system for providing a resource evaluation system that can evaluation the defect detection performance of resources that are executing test cases/scripts. Another goal is to comprehensively evaluate team member's performance. Another goal is to evaluate the breadth and depth of the team members knowledge. Another goal is to evaluate resources' performance based on multiple skill levels. Another goal is to evaluate resources' performance using both skill level and productivity. Another goal is to provide accurate resource evaluations. Another goal is to provide the ability to use historical data of various skill levels. Yet another goal is to increase the applicability and feasibility of evaluating resources' performance through the use of historical data of various skill levels.

In at least some implementations in accordance with the current technique described herein, the use of a resource evaluation system can provide one or more of the following advantages: comprehensively evaluate team member's performance, evaluate the breadth and depth of the team members knowledge, evaluate resources' performance based on multiple skill levels, evaluate resources' performance using both skill level and productivity, provide accurate resource evaluations, provide the ability to use historical data of various skill levels, and increase the applicability and feasibility of evaluating resources' performance through the use of historical data of various skill levels.

In contrast to conventional technologies, in at least some implementations in accordance with the current technique as described herein, resource evaluation is optimized by obtaining defect data, in response to executing software on a plurality of tester systems. The resource evaluation system determines a performance weighted metric associated with a defect detection resource and the defect data. Using the performance weighted metric, the resource evaluation system determines a defect scope delta percentage associated with the defect detection resource and the defect data. The resource evaluation system determines a defect detection resource score based on the defect scope delta percentage.

In an example embodiment of the current technique, the software is executed on a plurality of tester systems. An issue tracking system obtains the defect data resulting from the software execution, and associates the defect data with the defect detection resource. The issue tracking system then stores the defect data in a defect database.

In an example embodiment of the current technique, the performance weighted metric comprises a defect priority associated with the defect data.

In an example embodiment of the current technique, the defect priority is associated with the defect detection resource, where the defect detection resource generated the defect data.

In an example embodiment of the current technique, the performance weighted metric comprises a priority weight associated with a defect priority associated with the defect data.

In an example embodiment of the current technique, the performance weighted metric comprises a plurality of priority weights each associated with a respective defect priority in a plurality of defect priorities associated with the defect data, where the plurality of priority weights, when aggregated, equal one.

In an example embodiment of the current technique, the performance weighted metric comprises a plurality of defects detected associated with a defect priority associated with the defect data, where the plurality of defects detected is weighted with a priority weight associated with a defect priority associated with the defect data.

In an example embodiment of the current technique, the performance weighted metric comprises aggregating a plurality of weighted plurality of defects detected, where each of the plurality of weighted plurality of defects detected is associated with a respective defect priority and weighted with a respective priority weight.

In an example embodiment of the current technique, the resource evaluation system calculates a percentage difference between the performance weighted metric and a historical performance weighted metric associated with a plurality of defect detection resources.

In an example embodiment of the current technique, the historical performance weighted metric comprises a plurality of defects detected associated with the defect detection resource.

In an example embodiment of the current technique, the historical performance weighted metric comprises a plurality of defects detected associated with a second defect detection resource, where the second defect detection resource is associated with a defect priority associated with the defect data.

In an example embodiment of the current technique, the historical performance weighted metric comprises a plurality of defects detected associated with a second defect detection resource, where the second defect detection resource is associated with a second defect priority associated with the defect data.

In an example embodiment of the current technique, the resource evaluation system applies an impact factor to the second defect priority associated with the defect data.

In an example embodiment of the current technique, the resource evaluation system determines a test case percentage associated with the defect detection resource, where the test case percentage indicates a percentage of test cases the defect detection resource executed with respect to a plurality of defect detection resources.

In an example embodiment of the current technique, the resource evaluation system normalizes the defect scope delta percentage and the test case percentage.

In an example embodiment of the current technique, the resource evaluation system weights the defect scope delta percentage with a defect weight, and weights the test case percentage with a test case weight.

In an example embodiment of the current technique, the defect weight and test case weight, when aggregated, equal one.

In an example embodiment of the current technique, the resource evaluation system tunes at least one of the defect weight and the test case weight.

FIG. 1 shows a computer network (also referred to herein as an information processing system) 100 configured in accordance with an illustrative embodiment. The computer network 100 comprises a defect database 101, resource evaluation system 105, and tester systems 102-N. The defect database 101, resource evaluation system 105, and tester systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a resource evaluation system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the tester systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The tester systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the resource evaluation system 105 are one or more input-output devices, which illustratively comprise keyboards, displays or other types of input-output devices in any combination. Such input-output devices can be used, for example, to support one or more user interfaces to the resource evaluation system 105, as well as to support communication between the resource evaluation system 105 and other related systems and devices not explicitly shown. For example, a dashboard may be provided for a user to view a progression of the execution of the resource evaluation system 105. One or more input-output devices may also be associated with any of the tester systems 102-N.

Additionally, the resource evaluation system 105 in the FIG. 1 embodiment is assumed to be implemented using at least one processing device. Each such processing device generally comprises at least one processor and an associated memory, and implements one or more functional modules for controlling certain features of the resource evaluation system 105.

More particularly, the resource evaluation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the resource evaluation system 105 to communicate over the network 104 with the defect database 101, and tester systems 102-N and illustratively comprises one or more conventional transceivers.

A resource evaluation system 105 may be implemented at least in part in the form of software that is stored in memory and executed by a processor, and may reside in any processing device. The resource evaluation system 105 may be a standalone plugin that may be included within a processing device.

It is to be understood that the particular set of elements shown in FIG. 1 for resource evaluation system 105 involving the defect database 101, and tester systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the resource evaluation system 105 can be on and/or part of the same processing platform.

An exemplary process of resource evaluation system 105 in computer network 100 will be described in more detail with reference to, for example, the flow diagram of FIG. 2.

FIG. 2 is a flow diagram of a process for execution of the resource evaluation system 105 in an illustrative embodiment. It is to be understood that this particular process is only an example, and additional or alternative processes can be carried out in other embodiments.

In an example embodiment, the software is executed on a plurality of test systems 102-N. An issue tracking system, such as a system that allows bug tracking (i.e., defect tracking and collection) and agile project management is running in the background collecting data from the software executing on the plurality of test systems 102-N. The issue tracking system obtains defect data resulting from the software execution, and associates the defect data with the defect detection resource. The issue tracking system then stores the defect data in a defect database.

At 200, the resource evaluation system 105 obtains the defect data obtained in response to executing software on a plurality of tester systems. For example, the resource evaluation system 105 may obtain the defect data directly from the defect database 101. In an example embodiment, the defect data may be transmitted to the resource evaluation system 105 as the defect data is generated and/or as the defect data is stored in the defect database 101. In an example embodiment, the resource evaluation system 105 may be running continuously in the background as the software is executing on the plurality of test systems 102-N so as to obtain the defect data.

At 202, the resource evaluation system 105 determines a performance weighted metric associated with a defect detection resource and the defect data. In an example embodiment, the performance weighted metric (i.e., $C_{bug}$) may be defined as:

$$C_{bug} = \omega_{P00} \cdot C_{P00} + \omega_{P01} \cdot C_{P01} + \omega_{P02} \cdot C_{P02}$$

In an example embodiment, the performance weighted metric comprises a defect priority associated with the defect data. In the above equation, the defect priority is represented by "P00", "P01", and "P02". In an example embodiment, "P00" is the highest defect priority, "P01" is the next highest defect priority, and "P02" is the next highest defect priority.

In an example embodiment, the defect priority is associated with the defect detection resource, where the defect detection resource generated the defect data. For example, a defect detection resource, such as a test engineer, may generate/invoke/trigger defects (i.e., "bugs") during testing (through their skill) when running test cases on test systems 102-N. The defect detection resource may manually test the test systems 102-N and/or use a test case/script to automatically test the test systems 102-N. For example, a highly skilled defect detection resource may execute a test case/script to test the test systems 102-N, and may trigger seven "P01" bugs because the highly skilled tester executed the test case/script using different parameter settings (for example, using a different I/O tool, different cycle duration, different feature toggling, etc.) while executing the test case/script. A moderately skilled defect detection resource may execute the same test case/script on the test systems 102-N and only trigger one "P02" bugs, because the moderately skilled defect detection resource ran the test case/script only using a few common parameter settings in the test case/script. In this example, the highly skilled defect detection resource has demonstrated better "bug hunting" abilities than the moderately skilled defect detection resource.

In an example embodiment, in the above equation, $C_{P00}$ represents the bug count (i.e., the defect data) associated with the "P00" defect priority, $C_{P01}$ represents the bug count associated with the "P01" defect priority, and $C_{P02}$ represents the bug count associated with the "P02" defect priority.

In an example embodiment, the performance weighted metric comprises a priority weight associated with a defect priority associated with the defect data. In the above equation, the priority weights are $\omega_{P00}$, $\omega_{P01}$, and $\omega_{P02}$. In an example embodiment, where the performance weighted metric comprises a plurality of priority weights each associated with a respective defect priority in a plurality of defect priorities associated with the defect data. In the above equation, $\omega_{P00}$ is a priority weight associated with the "P00" defect priority, $\omega_{P01}$ is a priority weight associated with the "P01" defect priority, and $\omega_{P02}$ is a priority weight associated with the "P02" defect priority. In an example embodiment, the plurality of priority weights, when aggregated, equal one. In other words, $\omega_{P00}+\omega_{P01}+\omega_{P02}=1$.

Thus, in an example embodiment, the performance weighted metric comprises a plurality of defects detected associated with a defect priority associated with the defect data, where the plurality of defects detected is weighted with a priority weight associated with a defect priority associated with the defect data. In other words, the number of bugs $C_{P00}$ associated with the priority weight "P00" is weighted with a priority weight $\omega_{P00}$ leading to $\omega_{P00} \cdot C_{P00}$. The number of bugs $C_{P01}$ associated with the priority weight "P01" is weighted with a priority weight $\omega_{P01}$ leading to $\omega_{P01} \cdot C_{P01}$. The number of bugs $C_{P02}$ associated with the priority weight "P02" is weighted with a priority weight $\omega_{P02}$ leading to $\omega_{P02} \cdot C_{P02}$. Further, the performance weighted metric ($C_{bug}$) comprises aggregating a plurality of weighted plurality of defects detected, where each of the plurality of weighted plurality of defects detected is associated with a respective defect priority and weighted with a respective priority weight:

$$C_{bug} = \omega_{P00} \cdot C_{P00} + \omega_{P01} \cdot C_{P01} + \omega_{P02} \cdot C_{P02}$$

In an example embodiment, the priority weights are tuned to achieve an evaluation requirement of the defect detection resource.

The below table lists the number of bugs (i.e., defect data) found by Tester A, Tester B, Tester C, and Tester D, according to the defect priorities of "P00", "P01", and "P02". In an example embodiment, the priority weights of "P00" is 0.5, "P01" is 0.3, and "P02" 0.2, resulting in the performance weighted metric equaling $0.5*C_{P00}+0.3*C_{P01}+0.2*C_{P02}$. By calculating the performance weighted metric, the results reveal that defect detection resource "Tester A" outscored the other defect detection resources "Tester B, Tester C, and Tester D".

| Bug Count | Tester A | Tester B | Tester C | Tester D |
|---|---|---|---|---|
| P00 | 23 | 44 | 3 | 44 |
| P01 | 68 | 20 | 99 | 12 |
| P02 | 12 | 2 | 6 | 12 |
| Performance Weighted Metric | 34.3 ✓ | 28.4 | 32.4 | 28 |

At 204, using the performance weighted metric, the resource evaluation system 105 determines a defect scope delta percentage associated with the defect detection resource and the defect data. In an example embodiment, some test cases/scripts may produce a higher amount of defect data (i.e., a larger number of bugs) than other test cases/scripts. In an example embodiment, the defect scope delta percentage compares the amount of defect data generated by the defect detection resource compared to the amount of defect data that particular defect detection resource has generated historically using the same test case/script scope and within a given historical period.

In an example embodiment, the resource evaluation system 105 calculates a percentage difference between the performance weighted metric and a historical performance weighted metric associated with a plurality of defect detection resources. In an example embodiment, the historical performance weighted metric comprises a plurality of defects detected associated with the defect detection resource. In an example embodiment, the defect scope delta is defined as:

$$\Delta_{bug} = C_{bug,now} - C_{bug,history}$$

Thus, the incremental and/or decremental percentage (i.e., the defect scope delta percentage) of the defect scope delta is:

$$\Delta \%_{bug} = \frac{C_{bug,now} - C_{bug,history}}{C_{bug,history}}$$

The table below illustrates the calculated defect scope delta percentage:

| | Tester A | Tester B | Tester C | Tester D |
|---|---|---|---|---|
| Historical Performance Weighted Metric | 36 | 12 | 66 | 19 |
| Performance Weighted Metric | 34.3 | 28.4 | 32.4 | 28 |
| Increment/Decrement: $\Delta$ | -1.7 | 16.4 | -33.6 | 9 |
| Percentage: $\Delta \%_{bug}$ | -4.72% | 136.67% | -50.91% | 47.37% |

In this example embodiment, Tester A has the highest performance weighted metric, but Tester A's productivity has decreased by 1.7% and 4.72% against historical defect data, whereas Tester B has an overall lower performance weighted metric, but Tester B's productivity has increased by 16.4% and 136.6% against historical defect data. In an example embodiment, this data reveals that Tester B is highly, highly skilled at generating defect data (i.e., "bug hunting").

In an example embodiment, the historical performance weighted metric comprises a plurality of defects detected associated with a second defect detection resource, where the second defect detection resource is associated with a defect priority associated with the defect data. In an example embodiment, when historical defect data associated with a "first" defect detection resource is not available, the historical defect data of a second defect detection resource may be used to calculate the performance weighted metric of the "first" defect detection resource. For example, Tester A has generated defect data using 10 test cases that are related to the same test domain.

In an example embodiment, there may be different skill levels, such as:

Level 0: Novice
Level 1: Familiar
Level 2: Proficient
Level 3: Expert

In this example scenario, Tester A has a skill level of "Level 1: Familiar" for all 10 test cases.

In this example embodiment, the performance weighted metric for Tester A is calculated using the following equation:

$$C_{bug,now} = \omega_{P00} \cdot C_{P00} + \omega_{P01} \cdot C_{P01} + \omega_{P02}$$

If Tester A has not executed the 10 test cases, there is no historical defect data in the defect database 101 with which to calculate the historical performance weighted metric. There may be, however, historical defect data in the defect database 101 for the 10 test cases, where Tester B executed the 10 test cases and Tester B also has a skill level of "Level 1: Familiar" for all 10 test cases. In this example scenario, the resource evaluation system 105 uses the historical defect data associated with Tester B (i.e., the second defect detection resource) to calculate the performance weighted metric for Tester A (i.e., the "first" defect detection resource).

In an example embodiment, the historical performance weighted metric comprises a plurality of defects detected associated with a second defect detection resource, where the second defect detection resource is associated with a second defect priority associated with the defect data. If Tester A has not executed the 10 test cases, there is no historical defect data in the defect database 101 with which to calculate the historical performance weighted metric. In an example embodiment, there also may not be any historical defect data in the defect database 101 for any other tester who also has a skill level of "Level 1: Familiar". There may be, however, historical defect data in the defect database 101 for the 10 test cases, where Tester C executed the 10 test cases, and Tester C has a skill level of "Level 2: Proficient" for all 10 test cases. In this example scenario, the resource evaluation system 105 uses the historical defect data associated with Tester C (i.e., the second defect detection resource) associated with a second defect priority (i.e., the skill level of "Level 2: Proficient") to calculate the performance weighted metric for Tester A (i.e., the "first" defect detection resource).

In an example embodiment, when determining the defect scope delta percentage, an impact factor is applied to the second defect priority associated with the defect data. For example, Tester A (with a skill level of "Level 1: Familiar") has historical defect data of 100 bugs. The $C_{bug,now}$ value would be calculated as:

$$C_{bug,now} = \omega_{P00} \cdot C_{P00} + \omega_{P01} \cdot C_{P01} + \omega_{P02}$$

In an example embodiment, 50 of the bugs are detected through test cases/scripts that are associated with a skill level of "Level 1: Familiar", and there is historical defect data, so the $C_{bug,now}$ value would be calculated as:

$$C_{bug,level1} =$$
$$\omega_{P00,level1} \cdot C_{P00,level1} + \omega_{P01,level1} \cdot C_{P01,level1} + \omega_{P02,level1} \cdot C_{P02,level1}$$

However, if 50 of the bugs are detected through test cases/scripts that are associated with a skill level of "Level 0: Novice", and there is no historical defect data for any defect detection resource with a skill level of "Level 0: Novice", then the resource evaluation system 105 applies an impact factor when determining the defect scope delta percentage.

$$C_{bug,level0} =$$
$$avg\left(\frac{IF_{level0}}{IF_{level1}} \cdot C_{bug,level1} + \frac{IF_{level0}}{IF_{level2}} \cdot C_{bug,level2} + \frac{IF_{level0}}{IF_{level3}} \cdot C_{bug,level3}\right)$$

$$C_{bug,level0} == avg\left(\frac{IF_{level0}}{IF_{level1}} \cdot (\omega_{P00,level1} \cdot C_{P00,level1} + \omega_{P01,level1} \cdot C_{P01,level1} + \right.$$
$$\omega_{P02,level1} \cdot C_{P02,level1}) + \frac{IF_{level0}}{IF_{level2}} \cdot (\omega_{P00,level2} \cdot C_{P00,level2} + \omega_{P01,level2} \cdot$$
$$C_{P01,level2} + \omega_{P02,level2} \cdot C_{P02,level2}) + \frac{IF_{level0}}{IF_{level3}} \cdot (\omega_{P00,level3} \cdot$$
$$\left. C_{P00,level3} + \omega_{P01,level3} \cdot C_{P01,level3} + \omega_{P02,level3} \cdot C_{P02,level3})\right)$$

This yields the equation:

$$C_{bug,history} = C_{bug,level1} + C_{bug,level0}$$

$C_{bug,history}$ is used to calculate the defect scope delta percentage:

$$\Delta\%_{bug} = \frac{C_{bug,now} - C_{bug,history}}{C_{bug,hisitory}}$$

At 206, the resource evaluation system 105 determines a defect detection resource score based on the defect scope delta percentage. In an example embodiment, the defect detection resource score incorporates the defect detection resource's efforts spent on different kinds of tasks. In an example embodiment, the defect detection resource may be assigned a number of test cases/scripts to execute. The test cases/scripts may be represented by "TC" and the number (i.e., "count") of test cases/scripts may be represented by $C_{tc}$, where "m" is associated with a defect detection resource in a plurality of defect detection resources. In other words "m" may be associated with a test engineer on a team of test engineers.

In an example embodiment, the resource evaluation system 105 weights the defect scope delta percentage with a defect weight, $\omega_\Delta$, and weights the test case percentage with a test case weight, $\omega_{tc}$. In an example embodiment, the defect weight and test case weight, when aggregated, equal one; $\omega_\Delta + \omega_{tc} = 1$.

In an example embodiment, the resource evaluation system 105 tunes at least one of the defect weight and the test case weight. In an example scenario, the defect weight may be set to 0.5, and the test case weight may be set to 0.5. Each of these weights may be tuned (for example, 0.7/0.3 instead of 0.5/0.5) depending on which of the defect weight and the test case weight should carry more of an impact when calculating the defect detection resource score.

In an example embodiment, the defect detection resource score (i.e., "score' in the equation below) may be represented by the following equation:

$$Score = \omega_\Delta \cdot \Delta \%'_{bug} + \omega_{tc} \cdot C \%'_{tc}$$

In an example embodiment, the resource evaluation system 105 determines a test case percentage associated with the defect detection resource, where the test case percentage indicates a percentage of test cases the defect detection resource executed with respect to a plurality of defect detection resources. This may be represented as:

$$C \%_{tc} = \frac{C_{tc}}{\sum_1^m C_{tc}}$$

In an example embodiment, the resource evaluation system 105 normalizes the defect scope delta percentage and the test case percentage. For example, the resource evaluation system 105 uses Z-score normalization to normalize $\Delta \%_{bug}$ and $C\%_{tc}$.

$$\Delta \%'_{bug} = \frac{\Delta \%_{bug} - \overline{\Delta \%_{bug}}}{s}, \text{ and}$$

$$\overline{\Delta \%_{bug}} = \frac{1}{m} \sum_1^m \Delta \%_{bug}, s = \sqrt{\frac{1}{m-1} \sum_1^m (\Delta \%_{bug} - \overline{\Delta \%_{bug}^2})}$$

$$C \%'_{tc} = \frac{C \%_{tc} - \overline{C \%_{tc}}}{s}, \text{ and}$$

$$\overline{C \%_{tc}} = \frac{1}{m} \sum_1^m C \%_{tc}, s = \sqrt{\frac{1}{n-1} \sum_1^n (C \%_{tc} - \overline{C \%_{tc}^2})}$$

In an example embodiment, $\omega_\Delta$ and $\omega_{tc}$ are each 0.5. The resource evaluation system 105 calculates the defect detection resource score as follows:

| | Tester A | Tester B | Tester C | Tester D |
|---|---|---|---|---|
| Historical Performance Weighted Metric | 36 | 12 | 66 | 19 |
| Performance Weighted Metric | 34.3 | 28.4 | 32.4 | 28 |
| $\Delta \%_{bug}$ | −4.72% | 136.67% | −50.91% | 47.37% |
| $\Delta \%_{bug}'$ | −0.46 | 1.30 | −1.03 | 0.19 |
| Assigned Case count | 88 | 100 | 75 | 94 |
| $C \%_{tc}$ | 24.65% | 28.01% | 21.01% | 26.33% |
| $C \%_{tc}'$ | −0.12 | 1.01 | −1.33 | 0.44 |
| Defect Detection Resource Score | −0.29 | 1.15 | −1.18 | 0.32 |

The above calculations reveal that Tester B's performance is best, and Tester B is not only highly skilled at generating defects, but also has a high productivity.

In an example embodiment, an issue tracking system collects the defect data that includes test case/script assignment as well as test case/script execution by the defect detection resources and stores the defect data in the defect database 101.

For each defect detection resource, the resource evaluation system 105 obtains the skill level for each assigned test case/script. In an example embodiment, the defect database 101 stores information associated with each defect detection resource. Each defect detection resource is associated with a skill level associated with a domain, where a test case/script belongs to a respective domain. In an example embodiment, the skill level of a defect detection resource i on domain j is represented as $L_{Tester\ i, Domain\ j}$. The skill level score of defect detection resource i on test case/script j is represented as $L_{Tester\ i,\ TC\ j}$. As noted above, in an example embodiment, there are four levels of skill:

Level 0: Novice

Level 1: Familiar

Level 2: Proficient

Level 3: Expert

In an example embodiment, each defect detection resource is skilled on one or more domains as illustrated below:

| $L_{Tester\ i, Domain\ j}$ | Control path | NAS | Data path | GUI | Platform performance | Platform core | Platform IO | Service ability | security |
|---|---|---|---|---|---|---|---|---|---|
| Tester A | Level 2 | Level 0 | Level 1 | Level 1 | Level 3 | Level 1 | Level 0 | Level 0 | Level 2 |
| Tester B | 3 | 1 | 2 | 2 | 1 | 0 | 2 | 2 | 0 |
| Tester C | 2 | 0 | 1 | 1 | 0 | 2 | 0 | 0 | 1 |
| . . . | | | | | | | | | |
| Tester N | 1 | 3 | 0 | 2 | 3 | 1 | 1 | 0 | 2 |

From the above table, in an example embodiment, when Tester A is assigned 10 test cases/scripts, where 5 test cases/scripts are associated with Data Path, 3 test cases/scripts are associated with Control Path, and 2 as associated with GUI, the resource evaluation system 105 calculates Testers A's defect detection resource score on each test case/script. In an example embodiment, different domains may require different levels of skills to detect defect data. For example, the Data Path domain may be a domain where it is easy to detect defects, and thus, defect detection resources may detect a higher number of "bugs", but this does not necessarily mean those defect detection resources have a higher "bug hunting" ability.

In an example embodiment, for each defect detection resource assigned to each test case/script, if there is historical defect data (associated with the same skill level) in the defect database 101, the defect scope delta percentage is calculated using existing historical defect data. If there is no historical defect data in the defect database 101 associated with the same skill level, but there is historical defect data associated with a different skill level, or historical defect data associated with multiple skill levels, the impact factor (i.e., $\mathrm{IF}_{level\ i}$) is used to calculate the defect scope delta percentage.

| | Level 0 | Level 1 | Level 2 | Level 3 |
|---|---|---|---|---|
| Impact factor (IF) | 0.25 | 0.5 | 0.75 | 1 |

In an example embodiment, if there is no historical defect data associated with skill level 0, the bug count $C_{bug}$ of skill level 0 is calculated using historical defect data associated with skill level 1, skill level 2, and skill level 3 as long as historical defect data exists for at least one skill level.

$$C_{bug,level0} =$$

$$avg\left(\frac{IF_{level0}}{IF_{level1}} \cdot C_{bug,level1} + \frac{IF_{level0}}{IF_{level2}} \cdot C_{bug,level2} + \frac{IF_{level0}}{IF_{level3}} \cdot C_{bug,level3}\right)$$

In an example embodiment, the newly calculated $C_{bug,\,level\ 0}$ is then used to calculate the defect detection resource score as explained above:

$$\text{Score} = \omega_\Delta \cdot \Delta\ \%'_{bug} + \omega_{tc} \cdot C\ \%'_{tc}$$

In an example embodiment, if there is no historical defect data for at least one skill level, then the value would be zero, and the test case/script is most likely a newly designed test case/script with no historical defect data.

In an example embodiment, the resource evaluation system 105 may be extended to evaluate tasks other than defect detection. For example, the resource evaluation system 105 may be extended to evaluate the design of the test cases/scripts, the coding of the test cases/scripts, etc. In these example scenarios, priority attributes are defined based on the products being evaluated by the resource evaluation system 105, and historical data is used to obtain the final performance score.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve evaluation of defect detection resources. These and other embodiments can effectively improve the evaluation of defect detection resources to reach the end goal of providing a comprehensive evaluation. Embodiments disclosed herein comprehensively evaluate team member's performance. Embodiments disclosed herein evaluate the breadth and depth of the team members knowledge. Embodiments disclosed herein evaluate resources' performance based on multiple skill levels. Embodiments disclosed herein evaluate resources' performance using both skill level and productivity. Embodiments disclosed herein provide accurate resource evaluations. Embodiments disclosed herein provide the ability to use historical data of various skill levels. Embodiments disclosed herein increase the applicability and feasibility of evaluating resources' performance through the use of historical data of various skill levels.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 3 and 4. Although described in the context of the information processing system 100, these platforms may also be used to implement at least portions of other information processing systems in other embodiments.

Figure 3:
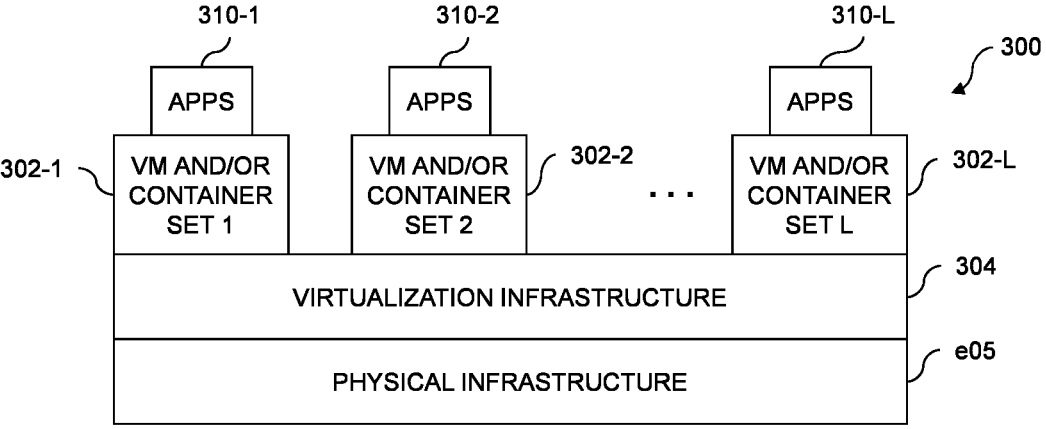
FIGS. 3 and 4 show examples of processing platforms that may be utilized to implement at least a portion of a resource evaluation system embodiments.
Figure 4:
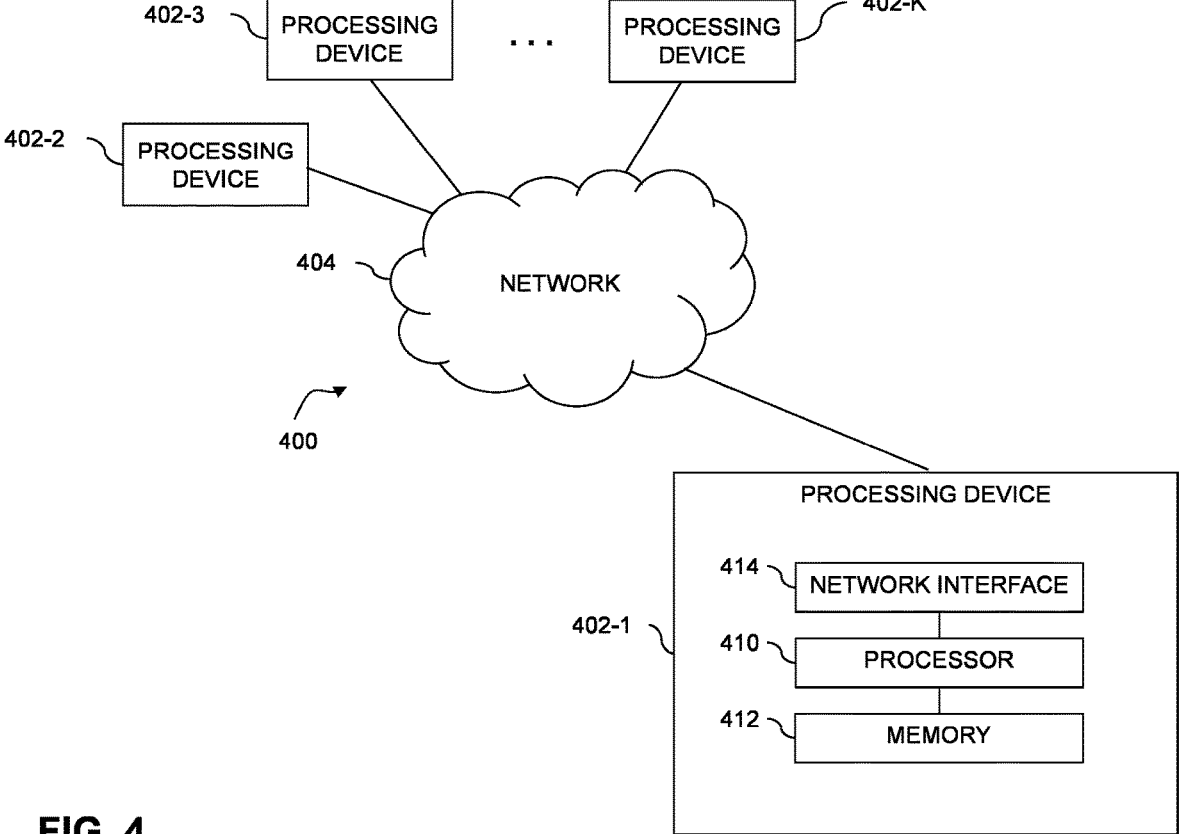

FIG. 3 shows an example processing platform comprising cloud infrastructure 300. The cloud infrastructure 300 comprises a combination of physical and virtual processing resources that are utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 comprise respective VMs, respective sets of one or more containers, or respective sets of one or more containers running in VMs. In some implementations of the FIG. 3 embodiment, the VMs/container sets 302 comprise respective VMs implemented using virtualization infrastructure 304 that comprises at least one hypervisor.

A hypervisor platform may be used to implement a hypervisor within the virtualization infrastructure 304, where the hypervisor platform has an associated virtual infrastructure management system. The underlying physical machines comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the information processing system 100 and includes a plurality of processing devices, denoted 402-1, 402-2, 402-3, . . . 402-K, which communicate with one another over a network 404.

The network 404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 402-1 in the processing platform 400 comprises a processor 410 coupled to a memory 412.

The processor 410 comprises a microprocessor, a microcontroller, an application-specific integrated circuit (ASIC), a field-programmable gate array (FPGA) or other type of processing circuitry, as well as portions or combinations of such circuitry elements.

The memory 412 comprises random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by a resource evaluation system configured to evaluate performance of test engineers, defect data obtained in response to executing software on a plurality of tester systems, wherein the defect data comprises defect priorities associated with defects detected by individual engineers;
determining, by the resource evaluation system, a performance weighted metric associated with a defect detection resource and the defect data;
using the performance weighted metric, determining a defect scope delta percentage associated with the defect detection resource and the defect data; and
determining a defect detection resource score based on the defect scope delta percentage, wherein the defect detection resource score evaluates individual test engineer performance, wherein the performance comprises productivity of the test engineer and the test engineer's skill breadth and depth of knowledge, wherein the method is implemented by at least one processing device comprising a processor coupled to a memory.

2. The method of claim 1 wherein obtaining, by the resource evaluation system, defect data comprises:
executing the software on a plurality of tester systems;
obtaining defect data resulting from the software execution;

associating the defect data with the defect detection resource; and
storing the defect data in a defect database.

3. The method of claim 1 wherein the performance weighted metric comprises a defect priority associated with the defect data.

4. The method of claim 3 wherein the defect priority is associated with the defect detection resource, wherein the defect detection resource generated the defect data.

5. The method of claim 1 wherein the performance weighted metric comprises a priority weight associated with a defect priority associated with the defect data.

6. The method of claim 1 wherein the performance weighted metric comprises a plurality of priority weights each associated with a respective defect priority in a plurality of defect priorities associated with the defect data, wherein the plurality of priority weights, when aggregated, equal one.

7. The method of claim 1 wherein the performance weighted metric comprises a plurality of defects detected associated with a defect priority associated with the defect data, wherein the plurality of defects detected is weighted with a priority weight associated with a defect priority associated with the defect data.

8. The method of claim 7 wherein the performance weighted metric comprises aggregating a plurality of weighted plurality of defects detected, wherein each of the plurality of weighted plurality of defects detected is associated with a respective defect priority and weighted with a respective priority weight.

9. The method of claim 1 wherein determining a defect scope delta percentage comprises:
calculating a percentage difference between the performance weighted metric and a historical performance weighted metric associated with a plurality of defect detection resources.

10. The method of claim 9 wherein the historical performance weighted metric comprises a plurality of defects detected associated with the defect detection resource.

11. The method of claim 9 wherein the historical performance weighted metric comprises a plurality of defects detected associated with a second defect detection resource, wherein the second defect detection resource is associated with a defect priority associated with the defect data.

12. The method of claim 9 wherein the historical performance weighted metric comprises a plurality of defects detected associated with a second defect detection resource, wherein the second defect detection resource is associated with a second defect priority associated with the defect data.

13. The method of claim 12 wherein, when determining the defect scope delta percentage, an impact factor is applied to the second defect priority associated with the defect data.

14. The method of claim 1 wherein determining a defect detection resource score comprises:
determining a test case percentage associated with the defect detection resource, wherein the test case percentage indicates a percentage of test cases the defect detection resource executed with respect to a plurality of defect detection resources.

15. The method of claim 1 wherein determining a defect detection resource score comprises:
normalizing the defect scope delta percentage and the test case percentage.

16. The method of claim 15 further comprising:
weighting the defect scope delta percentage with a defect weight; and
weighting the test case percentage with a test case weight.

17. The method of claim 16 wherein the defect weight and test case weight, when added together equal one.

18. The method of claim 16 further comprising:

tuning at least one of the defect weight and the test case weight.

19. A system comprising:

at least one processing device comprising a processor coupled to a memory;

the at least one processing device being configured:

to obtain, by a resource evaluation system configured to evaluate performance of test engineers, defect data obtained in response to executing software on a plurality of tester systems, wherein the defect data comprises defect priorities associated with defects detected by individual engineers;

to determine, by the resource evaluation system, a performance weighted metric associated with a defect detection resource and the defect data;

to use the performance weighted metric, determining a defect scope delta percentage associated with the defect detection resource and the defect data; and to determine a defect detection resource score based on the defect scope delta percentage, wherein the defect detection resource score evaluates individual test engineer performance, wherein the performance comprises productivity of the test engineer and the test engineer's skill breadth and depth of knowledge.

20. A computer program product comprising a non-transitory processor-readable storage medium having stored therein program code of one or more software programs, wherein the program code when executed by at least one processing device causes said at least one processing device:

to obtain, by a resource evaluation system configured to evaluate performance of test engineers, defect data obtained in response to executing software on a plurality of tester systems, wherein the defect data comprises defect priorities associated with defects detected by individual engineers;

to determine, by the resource evaluation system, a performance weighted metric associated with a defect detection resource and the defect data;

to use the performance weighted metric, determining a defect scope delta percentage associated with the defect detection resource and the defect data; and to determine a defect detection resource score based on the defect scope delta percentage, wherein the defect detection resource score evaluates individual test engineer performance, wherein the performance comprises productivity of the test engineer and the test engineer's skill breadth and depth of knowledge.

* * * * *